United States Patent
Chang et al.

(10) Patent No.: US 10,593,065 B2
(45) Date of Patent: Mar. 17, 2020

(54) METHOD AND DEVICE FOR CAMERA POSE ESTIMATION

(71) Applicant: HTC Corporation, Taoyuan (TW)

(72) Inventors: Che-Han Chang, Taoyuan (TW); Edward Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 164 days.

(21) Appl. No.: 15/658,404

(22) Filed: Jul. 25, 2017

(65) Prior Publication Data

US 2018/0033162 A1 Feb. 1, 2018

Related U.S. Application Data

(60) Provisional application No. 62/367,116, filed on Jul. 27, 2016.

(51) Int. Cl.
*G06K 9/00* (2006.01)
*G06T 7/00* (2017.01)
*G06T 7/70* (2017.01)
*G06K 9/62* (2006.01)

(52) U.S. Cl.
CPC ............ *G06T 7/97* (2017.01); *G06K 9/00664* (2013.01); *G06K 9/6274* (2013.01); *G06T 7/70* (2017.01); *G06T 2207/20081* (2013.01); *G06T 2207/20084* (2013.01); *G06T 2207/30244* (2013.01)

(58) Field of Classification Search
CPC .................... G06K 9/6256; G06K 9/32; G06T 2207/30244; G06T 7/80; G06T 2207/20081; G06T 7/75
See application file for complete search history.

(56) References Cited

U.S. PATENT DOCUMENTS

| | | | |
|---|---|---|---|
| 10,424,072 B2* | 9/2019 | Wang | G06K 9/4604 |
| 2006/0088203 A1* | 4/2006 | Boca | G06K 9/32 382/153 |
| 2013/0162785 A1* | 6/2013 | Michot | G06K 9/6289 348/50 |
| 2014/0206443 A1* | 7/2014 | Sharp | A63F 13/00 463/31 |
| 2014/0241617 A1* | 8/2014 | Shotton | G06K 9/00671 382/159 |

(Continued)

FOREIGN PATENT DOCUMENTS

CN 105144196 A 12/2015

OTHER PUBLICATIONS

Kendall, Alex, Matthew Grimes, and Roberto Cipolla. "Posenet: A convolutional network for real-time 6-dof camera relocalization." Proceedings of the IEEE international conference on computer vision. (Year: 2015).*

(Continued)

*Primary Examiner* — Li Liu
(74) *Attorney, Agent, or Firm* — CKC & Partners Co., LLC (57) ABSTRACT

A method includes acquiring a plurality of training images through a capturing component, acquiring a plurality of training camera poses of the capturing component corresponding to the training images through a pose sensor disposed corresponding to the capturing component, and training a camera pose estimation model according to the training images and the training camera poses of the capturing component.

18 Claims, 6 Drawing Sheets

(56) References Cited

U.S. PATENT DOCUMENTS

2015/0347846 A1* 12/2015 Guzm N-Rivera ............................ G06K 9/6256 382/103
2017/0256068 A1* 9/2017 Wang ........................ G06T 7/80
2017/0270390 A1* 9/2017 Fanello ................ G06K 9/6282
2018/0330504 A1* 11/2018 Karlinsky ................ G06T 7/11

OTHER PUBLICATIONS

Hughes, Lloyd Haydn. Enhancing mobile camera pose estimation through the inclusion of sensors. Diss. Stellenbosch: Stellenbosch University, 2014. (Year: 2014).*

Lee, Ah-Lam, and Jung-Han Kim. "3-Dimensional pose sensor algorithm for humanoid robot." Control engineering practice 18.10 (2010): 1173-1182. (Year: 2010).*

* cited by examiner

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
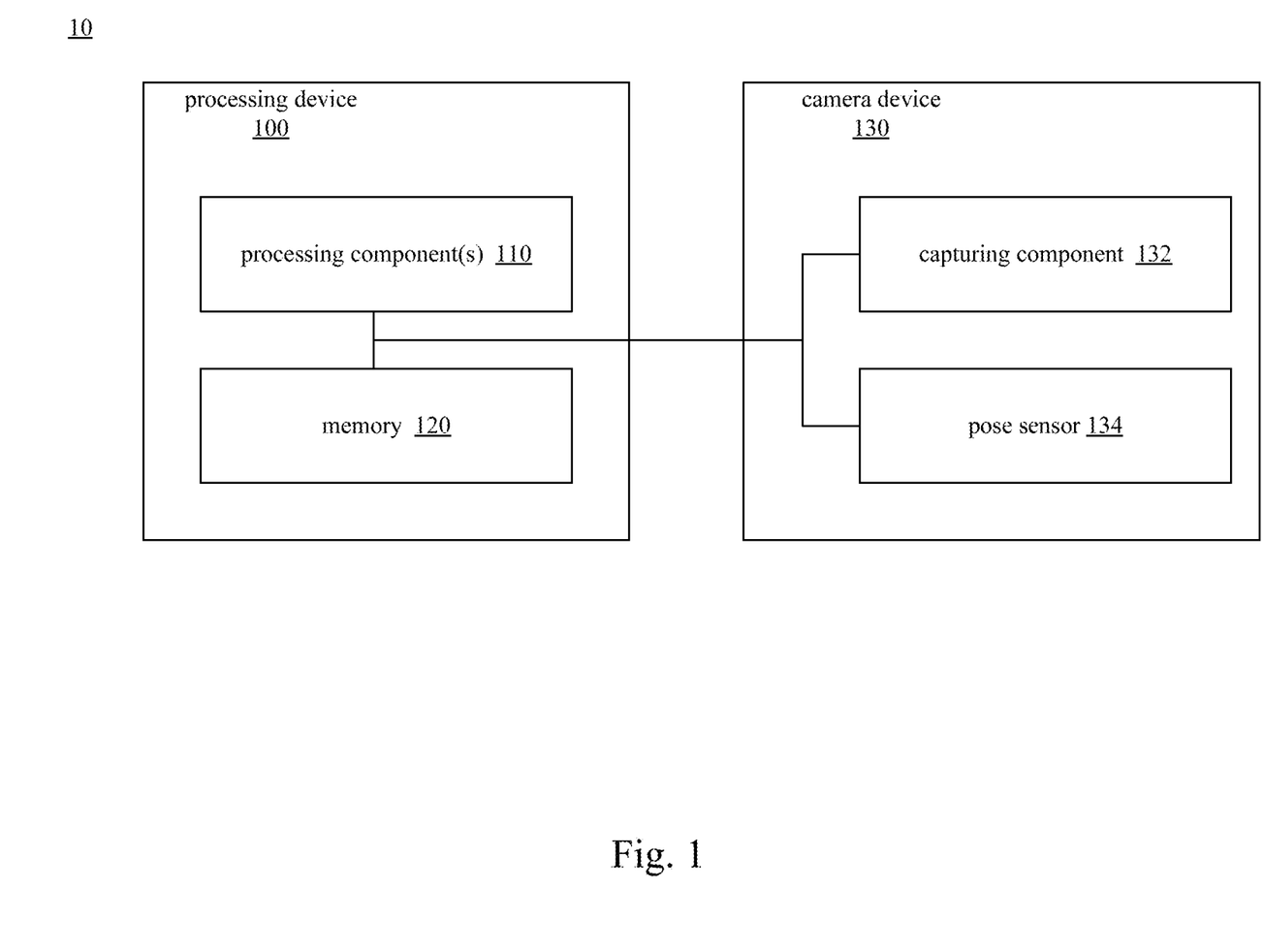

FIG. 1 is a schematic block diagram of a training system 10 in accordance with one embodiment of the present disclosure. In this embodiment, the training system 10 is configured for training a camera pose estimation model PSM/PSMa. With the camera pose estimation model PSM/PSMa, it is possible to estimate a camera pose of a camera device according to captured images. It should be noted that, in the description herein and throughout the claims that follow, the images or training images can be RGB images, RGBD images, infrared images, or another suitable images.

In this embodiment, the training system 10 includes a processing device 100 and a camera device 130. In one embodiment, the processing device 100 communicates with the camera device 130 via wired or wireless connection. In this embodiment, the processing device 100 is configured for training the camera pose estimation model PSM/PSMa according to images captured by the camera device 130 and pose information (e.g., camera poses) of the camera device 130.

In one embodiment, the processing device 100 may be realized by a computer, but the present disclosure is not limited to the embodiment described herein. In one embodiment, the camera device 130 may be realized by a HTC VIVE headset, but the present disclosure is not limited to the embodiment described herein. In one embodiment, the processing device 100 is integrated with the camera device 130, but the present disclosure is not limited to the embodiment described herein.

In one embodiment, the training system 10 further includes base stations (e.g., lighthouse base stations) (not shown) for positioning the camera device 130 and/or detecting orientation (e.g., tilt angles or rotating angles) of the camera device 130. However, other positioning method and/or method for detecting orientation are within the contemplated scope of the present disclosure.

In one embodiment, the processing device 100 includes one or more processing components 110 and a memory 120. In this embodiment, the one or more processing components 110 are electrically connected to the memory 120. In one embodiment, the processing device 100 further includes signal transceivers for transmitting and receiving signals between the processing device 100 and the camera device 130.

In one embodiment, the camera device 130 includes a capturing component 132 and a pose sensor 134. In one embodiment, the capturing component 132 and the pose sensor 134 are electrically connected to the processing components 110 and the memory 120. In one embodiment, the pose sensor 134 is disposed corresponding to the capturing component 132. In one embodiment, the pose sensor 134 is disposed adjacent to the capturing component 132, but the present disclosure is not limited in this regard. In one embodiment, the camera device 130 further includes signal transceivers for transmitting and receiving signals between the processing device 100 and the camera device 130.

In one embodiment, the one or more processing components 110 can be realized by, for example, one or more processors, such as central processors and/or microprocessors, but are not limited in this regard. In one embodiment, the memory 120 includes one or more memory devices, each of which comprises, or a plurality of which collectively comprise a computer readable storage medium. The computer readable storage medium includes a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this invention pertains. In one embodiment, the capturing component 132 may be realized by a RGB camera, a RGBD camera, an infrared camera, or another suitable light sensor, but the present disclosure is not limited in this regard. In one embodiment, the pose sensor 134 may be realized by a lighthouse sensor for receiving lights from lighthouse base stations, but the present disclosure is not limited in this regard. In one embodiment, the pose sensor 134 has one or more light sensors for receiving lights to sense the orientation and the position (i.e., the camera pose) of the camera device 130.

In one embodiment, the one or more processing components 110 runs or executes various software programs and/or sets of instructions stored in memory 120 to perform various functions for the processing device 100 and to process data.

It should be noted that the ways in which the devices and components in the training system 10 realized are not limited by the embodiments described above. In addition, the connections among these devices and components are not limited by the embodiments described above. Any configuration of these devices and components and interconnections there among that would enable the training system 10 to practice the technical features described below and/or in the claims can be used herein.

In one embodiment, the capturing component 132 is configured to capture training images. In one embodiment, the pose sensor 134 is configured to sense training orientations and training positions (i.e., training camera poses) of the capturing component 132, which are substantially identical to the training camera poses of the camera device 130, corresponding to the training images. In one embodiment, the training images are captured at different time points. In one embodiment, the pose sensor 134 is configured to sense the training camera poses of the capturing component 132 at these time points. For example, the training images may be respectively captured at 100 time points t1-t100, and the training camera poses are respectively sensed at time points t1-t100, substantially.

In one embodiment, the training images and the training camera poses corresponding to the training images may be acquired by using a HTC VIVE headset with the capturing component 132 and the pose sensor 134, but the present disclosure is not limited in this regard.

In one embodiment, the capturing component 132 and the pose sensor 134 may transmit the training images and the training camera poses to the one or more processing components 110, so as to allow the one or more processing components 110 to train the camera pose estimation model PSM according to the training images and the training camera poses of the capturing component 132. In one embodiment, the camera pose estimation model PSM includes a plurality of trainable parameters to be determined during the training process.

Figure 2:
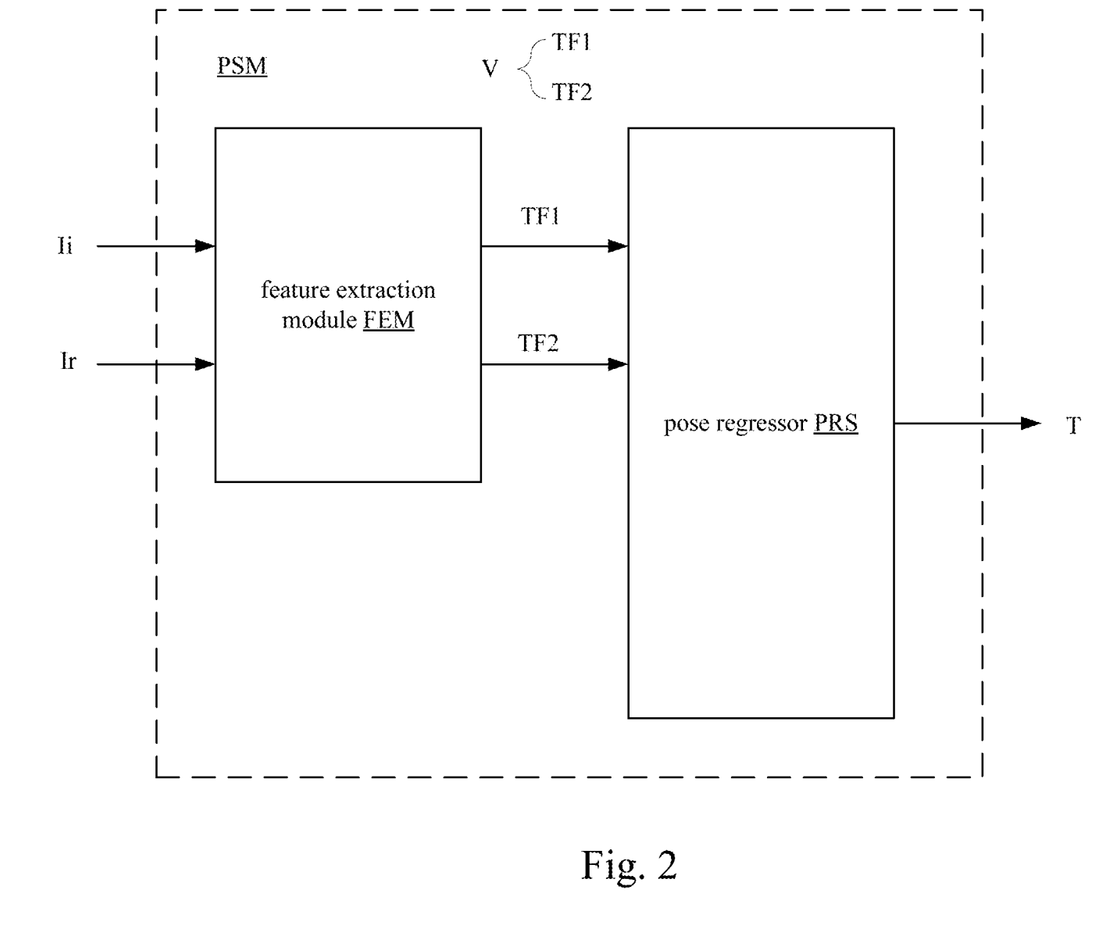

Reference is made to FIG. 2. In this embodiment, the one or more processing components 110 may train the camera pose estimation model PSM by using a machine learning algorithm. In this embodiment, the one or more processing components 110 may repeatedly take one of the training images as a reference image Ir (e.g., a first training input of the camera pose estimation model PSM), take another training image of the training images as an input image Ii (e.g., a second training input of the camera pose estimation model PSM), and take one of the training camera poses corresponding to the input image Ii as a label of the camera pose estimation model PSM. In this embodiment, the one or more processing components 110 may calculate an estimating camera pose according to the reference image Ir and the input image Ii by using the camera pose estimation model PSM, and calculate a loss function corresponding to the difference between the estimating camera pose and the corresponding training camera pose. In such a configuration, the one or more processing components 110 may determine the trainable parameters in the camera pose estimation model PSM by selecting parameters that can minimize loss functions corresponding to the differences between the estimating camera poses and the corresponding training camera poses.

For example, the one or more processing components 110 may take a training image It1 captured at time point t1 as the reference image Ir, take a training image It2 captured at time point t2 as the input image Ii, and take a training camera pose Pt2 sensed at time point t2 as a label. The one or more processing components 110 may calculate an estimating camera pose EP21 according to the training image It1, It2 by using the camera pose estimation model PSM, and calculate a loss function corresponding to the difference D21 between the estimating camera pose EP21 and the corresponding training camera pose Pt2.

Similarly, the one or more processing components 110 may estimate an estimating camera pose EP32 according to the training image It2 captured at time point t2 and the training image It3 captured at time point t3 by using the camera pose estimation model PSM, and calculate a loss function corresponding to the difference D32 between the estimating camera pose EP32 and the training camera pose Pt3 sensed at time point t3. The rest can be deduced by the same analog.

The one or more processing components 110 can determine the trainable parameters in the camera pose estimation model PSM by selecting parameters that can minimize loss functions corresponding to the differences (such as the differences D21, D32) between the estimating camera poses and the corresponding training camera poses.

In one embodiment, the camera pose estimation model PSM may include a feature extraction module FEM and a pose regressor PRS. In one embodiment, the feature extraction module FEM is configured to extract training feature sets corresponding to the training images (e.g., the reference image Ir and the input image Ii). In one embodiment, the feature extraction module FEM is configured to extract a training feature set TF1 from the reference image Ir and extract a training feature set TF2 from the input image Ii. In one embodiment, each of the training feature sets may be a vector with multiple degrees (e.g., 512 degrees).

In one embodiment, the pose regressor PRS is configured to calculate estimating camera poses according to the training feature sets extracted from the feature extraction module FEM. In one embodiment, the pose regressor PRS is configured to calculate an estimating camera pose according to the training feature set TF1 and the training feature set TF2.

In one embodiment, the feature extraction module FEM may be realized by using a convolutional neural network, a deep neural network, or any advanced deep leaning model, but another technique (e.g., a predetermined feature extraction function) are within the contemplated scope of the present disclosure. In one embodiment, the feature extraction module FEM includes a plurality of trainable parameters to be determined during the training process.

In one embodiment, the pose regressor PRS may be realized by using a convolutional neural network, a deep neural network, or any advanced deep leaning model, but another machine learning technique (e.g., a support vector machine (SVM) technique) are within the contemplated scope of the present disclosure. In one embodiment, the pose regressor PRS may be realized by using an optimizer which explicitly minimizes an error function with respect to camera pose. The optimizer may be realized by, for example, Lucas-Kanade algorithm, which aims to estimate parametric motion between two images. In one embodiment, the pose regressor PRS may be realized by using a specialized deep network which is combined by a deep neural network and an optimizer. In one embodiment, the pose regressor PRS includes a plurality of trainable parameters to be determined during the training process.

In one embodiment, the trainable parameters of the feature extraction module FEM and the pose regressor PRS can be determined by minimize loss functions corresponding to the differences between the estimating camera poses calculated by the pose regressor PRS and the corresponding training camera poses.

In one embodiment, if we denote the training feature set TF1 and the training feature set TF2 as V, the feature extraction executed by the feature extraction module FEM can be written as a function v below, in which $w_f$ is a collection of the trainable parameters in the feature extraction module FEM.

$$V=v(I_i,I_r|w_f)$$

Similarly, the pose regression executed by the pose regressor PRS can be written as a function g below, in which T is the estimating camera pose, and $w_p$ is a collection of the trainable parameters in the pose regressor PRS.

$$T=g(V|w_p)$$

If we denote $w=(w_f, w_p)$ as all the parameters of the camera pose estimation model PSM, and summarize the estimating process as function f, the estimating camera pose can be rewritten as the equation below.

$$T=f(I_i,I_r|w)$$

Given the training set with the training images and the training camera poses, w can be determined in the training process by minimizing a summation of loss functions L over w. The expression can be written below.

$$\min_{w} \sum_{\{(I_i, I_r, T)\}} L(f(I_i, I_r \mid w), T)$$

After training, trainable parameters in the camera pose estimation model PSM can be determined, so that it is possible to estimate a camera pose of the camera device 130 with images captured by the camera device 130, without the pose information from the pose sensor 134.

In some embodiments, the feature extraction module FEM may not be trained in the training process (e.g., the feature extraction module FEM is a predetermined feature extraction function and does not have any trainable parameter). In such embodiments, only trainable parameters in pose regressor PRS may be trained in training process.

Figure 3:
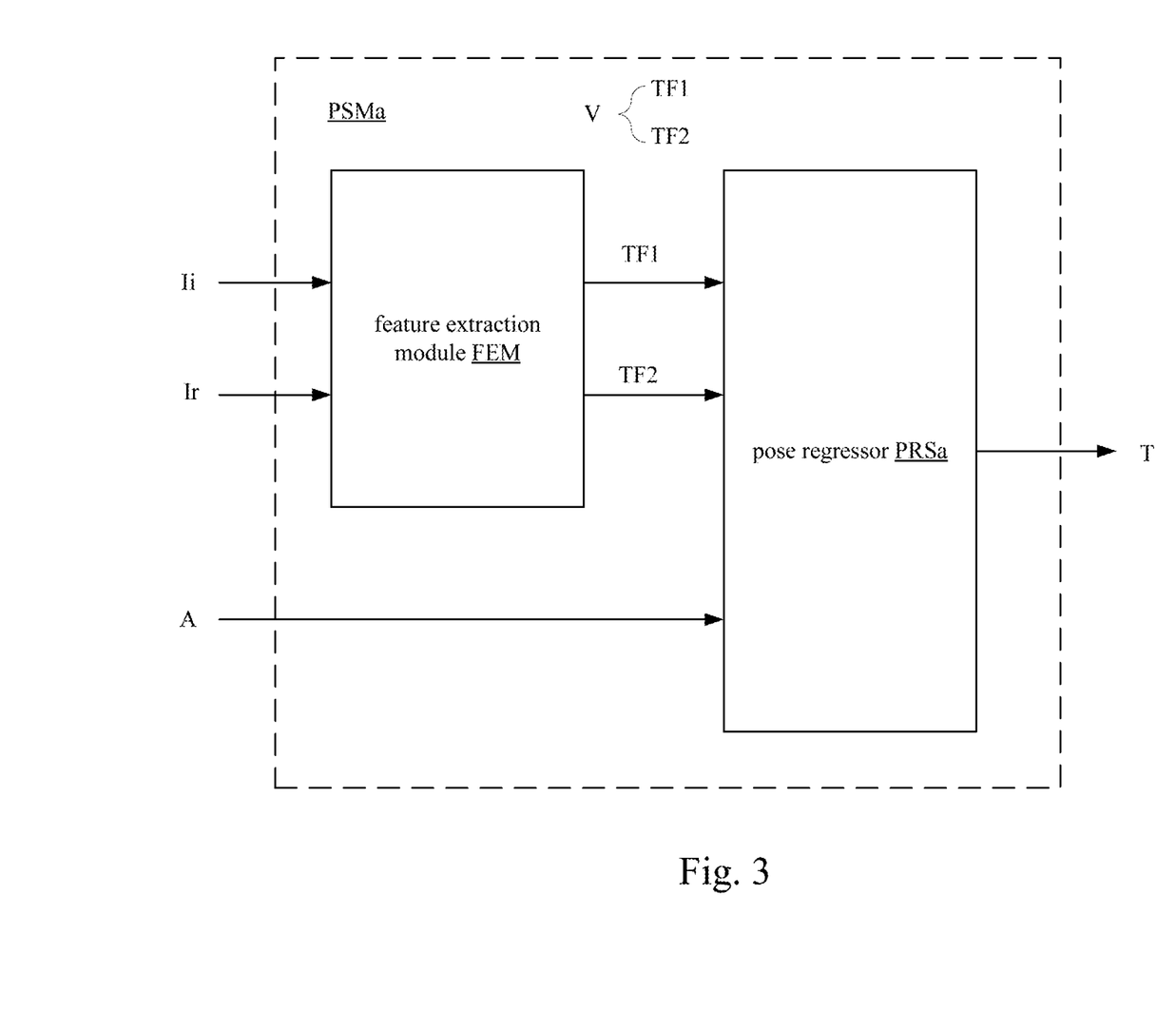

Reference is made to FIG. 3. In one embodiment, the camera device 130 further includes one or more auxiliary sensors (not shown). In one embodiment, the one or more auxiliary sensors may be realized by one or more inertial measurement unit (IMU) sensors, but the present disclosure is not limited in this regard. In one embodiment, the one or more auxiliary sensors may be realized by one or more of gyroscopes and accelerometers, but the present disclosure is not limited in this regard.

In one embodiment, the one or more auxiliary sensors may sense training auxiliary information corresponding to the training images. For example, the training images may be respectively captured at 100 time points t1-t100, and the training auxiliary information are respectively sensed at time points t1-t100, substantially. In one embodiment, the training auxiliary information includes one or more of training angular velocity information and training acceleration information.

In one embodiment, the training images, the training camera poses corresponding to the training images, and the training auxiliary information corresponding to the training images may be acquired by using a HTC VIVE headset, but the present disclosure is not limited in this regard.

In one embodiment, the one or more processing components 110 train a camera pose estimation model PSMa according to the training images, the training auxiliary information, and the training camera poses of the capturing component 132. It should be noted that, the configuration and the training process of the camera pose estimation model PSMa are similar to the configuration and the training process of the camera pose estimation model PSM described above, and a description of many aspects that are similar will not be repeated herein.

In this embodiment, the one or more processing components 110 may train the camera pose estimation model PSMa by using a machine learning algorithm. In this embodiment, the one or more processing components 110 may repeatedly take one of the training images as a reference image Ir (e.g., a first training input of the camera pose estimation model PSM), take another training image of the training images as an input image Ii (e.g., a second training input of the camera pose estimation model PSM), take a part of training auxiliary information (e.g., presented as A) corresponding to the reference image Ir and or the input image Ii, and take one of the training camera poses corresponding to the input image Ii as a label of the camera pose estimation model PSMa. In this embodiment, the one or more processing components 110 may calculate an estimating camera pose according to the reference image Ir, the input image Ii, and the part of training auxiliary information by using the camera pose estimation model PSMa, and calculate a loss function corresponding to the difference between the estimating camera pose and the corresponding training camera pose. In such a configuration, the one or more processing components 110 may determine the trainable parameters in the camera pose estimation model PSMa by selecting parameters that can minimize loss functions corresponding to the differences between the estimating camera poses and the corresponding training camera poses.

For example, the one or more processing components 110 may take a training image It1 captured at time point t1 as the reference image Ir, take a training image It2 captured at time point t2 as the input image Ii, take a part of auxiliary information At2 sensed at time point t2 as the auxiliary information, and take a training camera pose Pt2 sensed at time point t2 as a label. The one or more processing components 110 may calculate an estimating camera pose EP21 according to the training image It1, It2 and the part of auxiliary information At2 by using the camera pose estimation model PSMa, and calculate a loss function corresponding to the difference D21 between the estimating camera pose EP21 and the corresponding training camera pose Pt2.

Similarly, the one or more processing components 110 may estimate an estimating camera pose EP32 according to the training image It2 captured at time point t2, the training image It3 captured at time point t3, and a part of auxiliary information At3 sensed at time point t3 by using the camera pose estimation model PSMa, and calculate a loss function corresponding to the difference D32 between the estimating camera pose EP32 and the training camera pose Pt3 sensed at time point t3. The rest can be deduced by the same analog.

The one or more processing components 110 can determine the trainable parameters in the camera pose estimation model PSMa by selecting parameters that can minimize loss functions corresponding to the differences (such as the differences D21, D32) between the estimating camera poses and the corresponding training camera poses.

In one embodiment, the camera pose estimation model PSMa may include a feature extraction module FEM and a pose regressor PRSa. The feature extraction module FEM in the camera pose estimation model PSMa is substantially identical to the feature extraction module FEM in the camera pose estimation model PSM, and details in this regard will not be repeated herein.

In one embodiment, the pose regressor PRSa is configured to calculate estimating camera poses according to the training feature sets extracted from the feature extraction module FEM and the training auxiliary information. In one embodiment, the pose regressor PRSa is configured to calculate an estimating camera pose according to the training feature set TF1, the training feature set TF2, and the part of the training auxiliary information A corresponding to the reference image Ir and or the input image Ii.

It should be noted that the realizations of the feature extraction module FEM and the pose regressor PRSa in the camera pose estimation model PSMa are similar to the realizations of the feature extraction module FEM and the pose regressor PRS in the camera pose estimation model PSM, and details in this regard will not be repeated herein.

In one embodiment, if we denote the training feature set TF1 and the training feature set TF2 as V, the feature extraction executed by the feature extraction module FEM can be written as a function v below, in which $w_f$ is a collection of the trainable parameters in the feature extraction module FEM.

$$V = v(I_i, I_r \mid w_f)$$

Similarly, the pose regression executed by the pose regressor PRSa can be written as a function g below, in which T is the estimating camera pose, and $w_p$ is a collection of the trainable parameters in the pose regressor PRSa.

$$T=g(V,A|w_p)$$

If we denote $w=(w_f, w_p)$ as all the parameters of the camera pose estimation model PSMa, and summarize the estimating process as function f, the estimating camera pose can be rewritten as the equation below.

$$T=f(I_i,I_r,A|w)$$

Given the training set with the training images and the training camera poses, w can be determined in the training process by minimizing a summation of loss functions L over w. The expression can be written below.

$$\min_w \sum_{\{(I_i,I_r,A,T)\}} L(f(I_i, I_r, A | w), T)$$

After training, trainable parameters in the camera pose estimation model PSMa can be determined, so that it is possible to estimate a camera pose of the camera device 130 with images captured by the camera device 130, without the pose information from the pose sensor 134.

In some embodiments, the feature extraction module FEM may not be trained in the training process (e.g., the feature extraction module FEM is a predetermined feature extraction function and does not have any trainable parameter). In such embodiments, only trainable parameters in pose regressor PRSa may be trained in training process.

Figure 4:
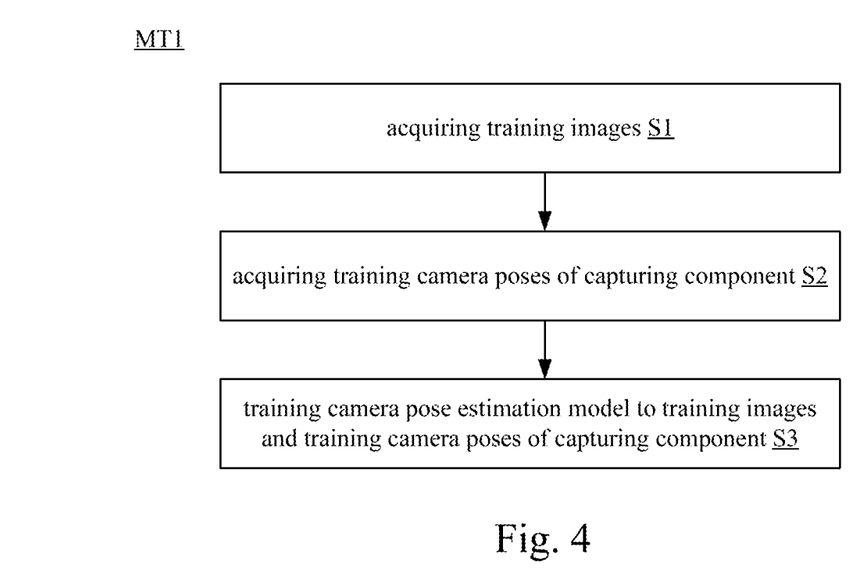

Details of the present disclosure are described in the paragraphs below with reference to a training method in FIG. 4. However, the present disclosure is not limited to the embodiment below.

It should be noted that the training method can be applied to a training system having a structure that is the same as or similar to the structure of the training system 10 shown in FIG. 1. To simplify the description below, the embodiment shown in FIG. 1 will be used as an example to describe the training method according to an embodiment of the present disclosure. However, the present disclosure is not limited to application to the embodiment shown in FIG. 1.

It should be noted that, in some embodiments, the training method may be implemented as a computer program. When the computer program is executed by a computer, an electronic device, or the one or more processing components 110 in FIG. 1, this executing device performs the training method. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the following training method, no particular sequence is required unless otherwise specified. Moreover, the following operations also may be performed simultaneously or the execution times thereof may at least partially overlap.

Furthermore, the operations of the following training method may be added to, replaced, and/or eliminated as appropriate, in accordance with various embodiments of the present disclosure.

Reference is made to FIGS. 1 and 2. The training method MT1 includes the operations below.

In operation S1, the one or more processing components 110 acquire a plurality of training images through the capturing component 132.

In operation S2, the one or more processing components 110 acquire a plurality of training camera poses of the capturing component 132 corresponding to the training images through the pose sensor 134.

In operation S3, the one or more processing components 110 train a camera pose estimation model according to the training images and the training camera poses of the capturing component 132.

In one embodiment, the one or more processing components 110 may train a first camera pose estimation model PSM according to the training images and the training camera poses of the capturing component 132, without using training auxiliary information. In one embodiment, the one or more processing components 110 may train a second camera pose estimation model PSMa according to the training images, the training auxiliary information, and the training camera poses of the capturing component 132. Details of the training auxiliary information can be ascertained with reference to the paragraph above.

Through the operations described above, it is possible to estimate a camera pose of the camera device 130 with images captured by the camera device 130, without the pose information from the pose sensor 134.

Figure 5:
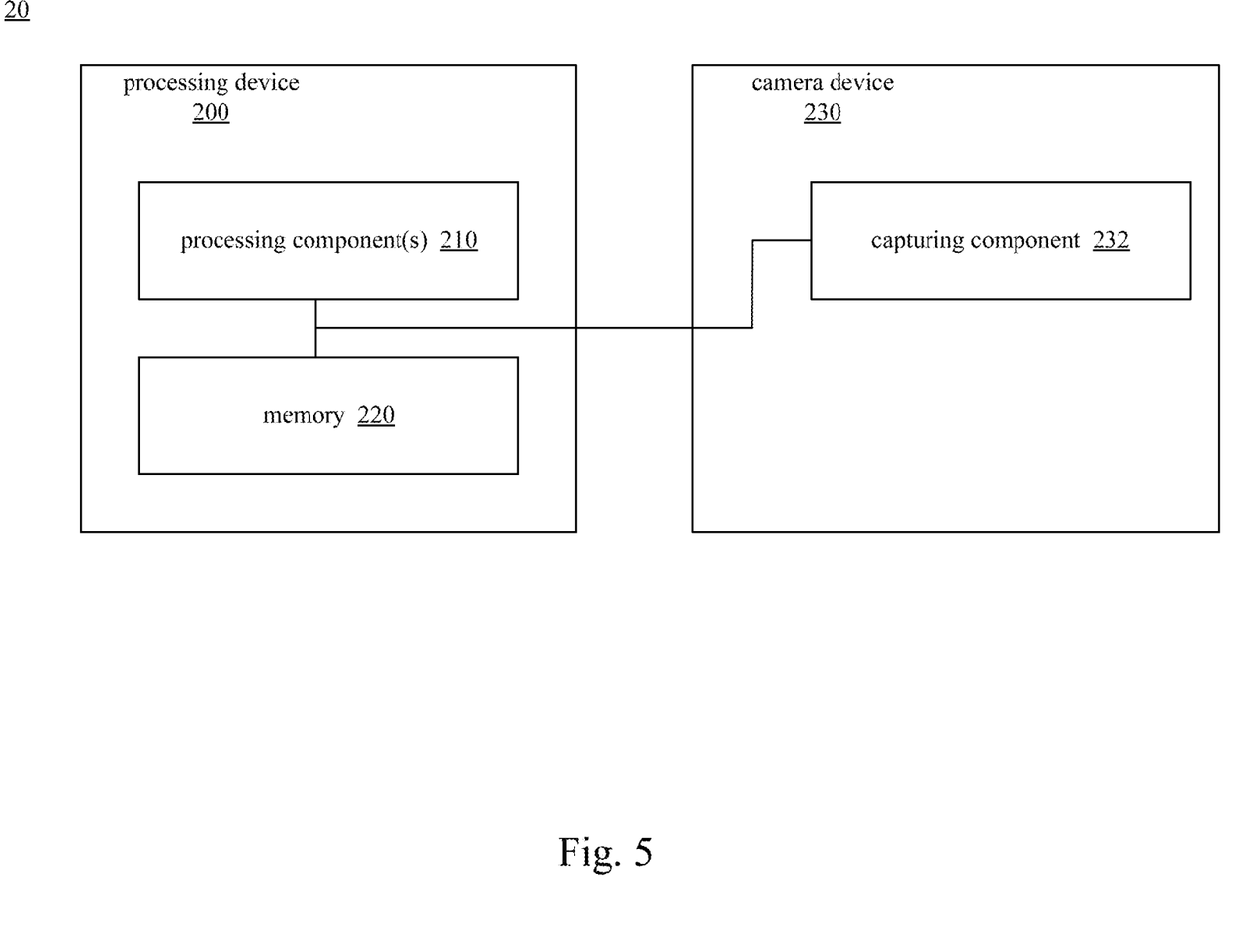

FIG. 5 is a schematic block diagram of a camera system 20 in accordance with one embodiment of the present disclosure. In this embodiment, the camera system 20 stores the trained camera pose estimation model PSM/PSMa described above, so that it is possible to estimate a camera pose of a camera device according to captured images by using the trained camera pose estimation model PSM/PSMa.

In this embodiment, the camera system 20 includes a processing device 200 and a camera device 230. In one embodiment, the processing device 200 communicates with the camera device 230 via wired or wireless connection. In this embodiment, the processing device 200 is configured for estimating the camera pose of the camera device 230 according to images captured by the camera device 230 by using the camera pose estimation model PSM/PSMa.

In one embodiment, the processing device 200 may be realized by a computer, but the present disclosure is not limited to the embodiment described herein. In one embodiment, the camera device 230 may be realized by a HTC VIVE headset, but the present disclosure is not limited to the embodiment described herein. In one embodiment, the processing device 200 is integrated with the camera device 230, but the present disclosure is not limited to the embodiment described herein. In one embodiment, the camera system 20 can be, for example, a VR system, a mobile device, or a tablet device, but the present disclosure is not limited to the embodiment described herein.

In one embodiment, the processing device 200 includes one or more processing components 210 and a memory 220. In this embodiment, the one or more processing components 210 are electrically connected to the memory 220. In one embodiment, the processing device 200 further includes signal transceivers for transmitting and receiving signals between the processing device 200 and the camera device 230.

In one embodiment, the camera device 230 includes a capturing component 232. In one embodiment, the capturing component 232 is electrically connected to the processing components 210 and the memory 220. In one embodiment, the camera device 230 further includes signal transceivers for transmitting and receiving signals between the processing device 200 and the camera device 230.

In one embodiment, the one or more processing components 210 can be realized by, for example, one or more processors, such as central processors and/or microprocessors, but are not limited in this regard. In one embodiment, the memory 220 includes one or more memory devices, each of which comprises, or a plurality of which collectively comprise a computer readable storage medium. The computer readable storage medium includes a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this invention pertains. In one embodiment, the capturing component 232 may be realized by a RGB camera, a RGBD camera, an infrared camera, or another suitable light sensor, but the present disclosure is not limited in this regard.

In one embodiment, the one or more processing components 210 runs or executes various software programs and/or sets of instructions stored in memory 220 to perform various functions for the processing device 200 and to process data.

It should be noted that the ways in which the devices and components in the camera system 20 realized are not limited by the embodiments described above. In addition, the connections among these devices and components are not limited by the embodiments described above. Any configuration of these devices and components and interconnections there among that would enable the camera system 20 to practice the technical features described below and/or in the claims can be used herein.

In one embodiment, the memory 220 is configured to store the camera pose estimation model PSM described above. In one embodiment, the capturing component 232 is configured to capture an input image and a reference image. In one embodiment, the capturing component 232 captures the input image and the reference image with different camera poses. In one embodiment, the capturing component 232 transmits the input image and the reference image to the one or more processing components 210.

In one embodiment, the one or more processing components 210 estimate the camera pose of the capturing component 232, which is substantially identical to the camera pose of the camera device 230, according to the input image and the reference image by using the camera pose estimation model PSM.

In one embodiment, the one or more processing components 210 use the feature extraction module FEM in the camera pose estimation model PSM to extract a first feature set from the input image and a second feature set from the reference image. In one embodiment, the one or more processing components 210 use the pose regressor PRS in the camera pose estimation model PSM to calculate the camera pose of the capturing component 232 according to the first feature set and the second feature set.

With the operations described above, it is possible to estimate a camera pose of the camera device 230 with images captured by the camera device 230, without the pose information from any pose sensor.

In one embodiment, the camera device 230 further includes one or more auxiliary sensors (not shown). In one embodiment, the one or more auxiliary sensors may be realized by one or more inertial measurement unit (IMU) sensors, but the present disclosure is not limited in this regard. In one embodiment, the one or more auxiliary sensors may be realized by one or more of gyroscopes and accelerometers, but the present disclosure is not limited in this regard.

In this embodiment, the memory 220 is configured to store the camera pose estimation model PSMa described above. In one embodiment, the one or more auxiliary sensors may sense auxiliary information corresponding to the input image. In one embodiment, the auxiliary information includes one or more of angular velocity information and acceleration information.

In this embodiment, the one or more processing components 210 estimate the camera pose of the capturing component 232 according to the input image, the reference image, and the auxiliary information by using the camera pose estimation model PSMa.

In this embodiment, the one or more processing components 210 use the pose regressor PRSa in the camera pose estimation model PSMa to calculate the camera pose of the capturing component 232 according to the first feature set and the second feature set extracted by the feature extraction module FEM and the auxiliary information.

With the operations described above, it is possible to estimate a camera pose of the camera device 230 with images captured by the camera device 230 and the auxiliary information, without the pose information from any pose sensor.

Details of the present disclosure are described in the paragraphs below with reference to an estimating method in FIG. 6. However, the present disclosure is not limited to the embodiment below.

It should be noted that the estimating method can be applied to a camera system having a structure that is the same as or similar to the structure of the camera system 20 shown in FIG. 5. To simplify the description below, the embodiment shown in FIG. 5 will be used as an example to describe the estimating method according to an embodiment of the present disclosure. However, the present disclosure is not limited to application to the embodiment shown in FIG. 5.

It should be noted that, in some embodiments, the estimating method may be implemented as a computer program. When the computer program is executed by a computer, an electronic device, or the one or more processing components 210 in FIG. 5, this executing device performs the estimating method. The computer program can be stored in a non-transitory computer readable medium such as a ROM (read-only memory), a flash memory, a floppy disk, a hard disk, an optical disc, a flash disk, a flash drive, a tape, a database accessible from a network, or any storage medium with the same functionality that can be contemplated by persons of ordinary skill in the art to which this invention pertains.

In addition, it should be noted that in the operations of the following estimating method, no particular sequence is required unless otherwise specified. Moreover, the following operations also may be performed simultaneously or the execution times thereof may at least partially overlap.

Furthermore, the operations of the following estimating method may be added to, replaced, and/or eliminated as appropriate, in accordance with various embodiments of the present disclosure.

Figure 6:
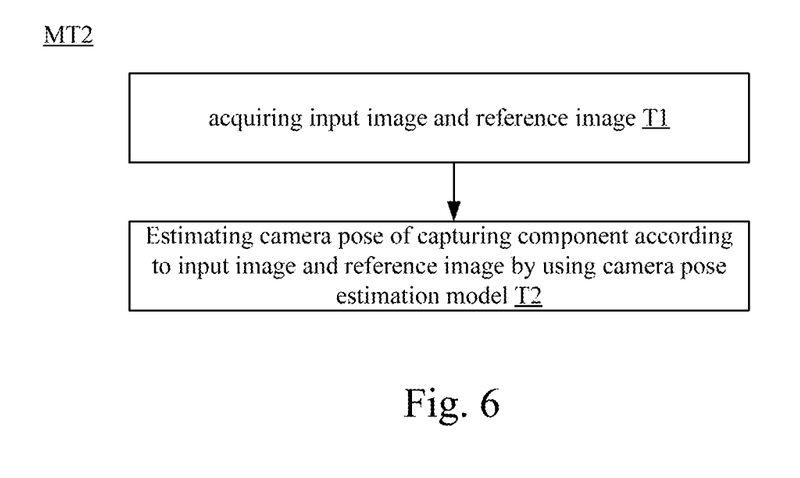

Reference is made to FIGS. 5 and 6. The estimating method MT2 includes the operations below.

In operation T1, the one or more processing components 210 acquire an input image and a reference image through a capturing component 230.

In operation T2, the one or more processing components 210 estimate the camera pose of the capturing component 230 according to the input image and the reference image by using a camera pose estimation model.

In one embodiment, the one or more processing components 210 may estimate the camera pose of the capturing component 230 according to the input image and the reference image by using a camera pose estimation model PSM, without using the auxiliary information. In one embodiment, the one or more processing components 210 may estimate the camera pose of the capturing component 230 according to the input image, the reference image, and auxiliary information by using a camera pose estimation model PSMa. Details of the auxiliary information can be ascertained with reference to the paragraph above.

Through the operations described above, it is possible to estimate a camera pose of the camera device 230 with images captured by the camera device 230 and the auxiliary information, without the pose information from any pose sensor.

Although the present invention has been described in considerable detail with reference to certain embodiments thereof, other embodiments are possible. Therefore, the scope of the appended claims should not be limited to the description of the embodiments contained herein.

What is claimed is:

1. A method comprising:
    acquiring a plurality of training images through a capturing component;
    acquiring a plurality of training camera poses of the capturing component corresponding to the training images through a pose sensor disposed corresponding to the capturing component; and
    training a camera pose estimation model according to the training images and the training camera poses of the capturing component;
    wherein the operation of training the camera pose estimation model comprises:
    extracting training feature sets from the training images by using a feature extracting module;
    calculating estimating camera poses according to the training feature sets by using a pose regressor; and
    training the camera pose estimation model according to loss functions corresponding to differences between the estimating camera poses and the training camera poses, wherein the loss functions include a plurality of inputs, and wherein the inputs include the estimating camera poses, and the estimating camera poses are a function of the training feature sets.

2. The method as claimed in claim 1, wherein one of the training images is captured while a corresponding one of the training camera poses is sensed.

3. The method as claimed in claim 1, wherein the pose regressor comprises a plurality of trainable parameters, and training the camera pose estimation model according to the loss functions comprises:
    determining the trainable parameters of the camera pose estimation model by minimizing the loss functions.

4. The method as claimed in claim 1, wherein the feature extracting module comprises a plurality of first trainable parameters, and the pose regressor comprises a plurality of second trainable parameters, and training the camera pose estimation model according to the loss functions comprises:
    determining the first trainable parameters of the feature extracting module and the second trainable parameters of the pose regressor by minimizing the loss functions.

5. The method as claimed in claim 1 further comprising:
    acquiring training auxiliary information through one or more auxiliary sensors;
    wherein the inputs of the loss functions include the estimating camera poses, and the estimating camera poses are a function of the training feature sets and the training auxiliary information.

6. The method as claimed in claim 5, wherein the training auxiliary information comprises one or more of training angular velocity information and training acceleration information.

7. A method for estimating a camera pose of a capturing component, comprising:
    providing a camera pose estimation model;
    training the camera pose estimation model to obtain a trained camera pose estimation model;
    providing the capturing component;
    acquiring an input image and a reference image through the capturing component; and
    estimating the camera pose of the capturing component by using the input image, reference image and the trained camera pose estimation model;
    wherein the camera pose estimation model is trained according to training images and training camera poses, and wherein the training camera poses are acquired through a pose sensor.

8. The method as claimed in claim 7, wherein the operation of estimating the camera pose of the capturing component comprises:
    extracting a first feature set from the input image and a second feature set from the reference image; and
    estimating the camera pose of the capturing component according to the first feature set and the second feature set by using a pose regressor.

9. The method as claimed in claim 8, wherein the pose regressor is trained according to the training camera poses and training feature sets extracted from the training images.

10. The method as claimed in claim 7 further comprising:
    acquiring auxiliary information through one or more auxiliary sensor;
    wherein the operation of estimating the camera pose of the capturing component comprises:
    estimating the camera pose of the capturing component by using the input image, the reference image, the auxiliary information, and trained camera pose estimation model.

11. The method as claimed in claim 10, wherein the auxiliary information comprises one or more of angular velocity information and acceleration information.

12. The method as claimed in claim 7, wherein the camera pose estimation is trained by calculating estimating camera poses according to the training images with the camera pose estimation model and determining trainable parameters of the camera pose estimation model by minimizing loss functions corresponding to differences between the estimating camera poses and the training camera poses.

13. A device for estimating a camera pose of a capturing component, comprising:
    the capturing component;
    one or more processing components electrically connected to the capturing component;
    a memory electrically connected to the one or more processing components; and
    one or more programs, wherein the one or more programs are stored in the memory and configured to be executed by the one or more processing components, the one or more programs comprising instructions for:
    providing a camera pose estimation model;
    training the camera pose estimation model to obtain a trained camera pose estimation model;

acquiring an input image and a reference image through the capturing component; and estimating a camera pose of the capturing component by using the input image, the reference image, and the trained camera pose estimation model;

wherein the camera pose estimation model is trained according to training images and training camera poses, and wherein the training camera poses are acquired through a pose sensor.

14. The device as claimed in claim 13, wherein the one or more programs further comprises instructions for:

extracting a first feature set from the input image and a second feature set from the reference image; and estimating the camera pose of the capturing component according to the first feature set and the second feature set by using a pose regressor.

15. The device as claimed in claim 13, wherein the pose regressor is trained according to the training camera poses and training feature sets extracted from the training images.

16. The device as claimed in claim 13, wherein the one or more programs further comprises instructions for:

acquiring auxiliary information through one or more auxiliary sensor; and estimating the camera pose of the capturing component by using the input image, the reference image, the auxiliary information, and the trained camera pose estimation model.

17. The device as claimed in claim 16, wherein the auxiliary information comprises one or more of angular velocity information and acceleration information.

18. The device as claimed in claim 13, wherein the camera pose estimation is trained by calculating estimating camera poses according to the training images with the camera pose estimation model and determining trainable parameters of the camera pose estimation model by minimizing loss functions corresponding to differences between the estimating camera poses and the training camera poses.

* * * * *